United States Patent
Hirsch et al.

(10) Patent No.: US 6,936,368 B2
(45) Date of Patent: Aug. 30, 2005

(54) SYSTEM AND METHOD FOR SAFE REMOVAL/OXIDATIVE DECOMPOSITION OF FUEL FROM A FUEL CONTAINER

(75) Inventors: Robert S. Hirsch, Troy, NY (US); Shimshon Gottesfeld, Niskayuna, NY (US); Xiaoming Ren, Menands, NY (US)

(73) Assignee: The Gillette Company, Boston, MA (US)

( * ) Notice: Subject to any disclaimer, the term of this patent is extended or adjusted under 35 U.S.C. 154(b) by 133 days.

(21) Appl. No.: 10/417,453

(22) Filed: Apr. 16, 2003

(65) Prior Publication Data

US 2004/0209143 A1 Oct. 21, 2004

(51) Int. Cl.[7] .......................... H01M 2/02; H01M 2/00; H01M 8/04; B65D 90/02
(52) U.S. Cl. ............................ 429/34; 429/30; 429/35; 429/36; 429/40; 429/13; 220/565
(58) Field of Search .............................. 429/34, 30, 35, 429/36, 40, 13

(56) References Cited

U.S. PATENT DOCUMENTS

| | | | |
|---|---|---|---|
| 4,562,123 A | * | 12/1985 | Shimizu et al. ............... 429/27 |
| 6,460,733 B2 | | 10/2002 | Acker et al. |
| 2003/0091883 A1 | * | 5/2003 | Peled et al. .................... 429/25 |
| 2003/0170508 A1 | * | 9/2003 | Beckmann et al. ........... 429/13 |

OTHER PUBLICATIONS

"Apparatus and Methods For Generating Water in a Fuel Cell System," Beckmann et al. U.S. Appl. No. 10/091,821 filed Mar. 6, 2002, 14 pages.

* cited by examiner

*Primary Examiner*—Patrick Joseph Ryan
*Assistant Examiner*—Angela J. Martin
(74) *Attorney, Agent, or Firm*—Cesari and McKenna LLP

(57) ABSTRACT

A system and method for removal or oxidative decomposition of fuel from a fuel storage container for use in a direct oxidation fuel cell and direct oxidation fuel cell system wherein the fuel permeates through a material and can be exposed to a catalyst/enzyme which oxidizes the fuel as it leaves the storage container. The system includes a fuel storage container provided with a catalyst-coated material. An airtight seal is provided over the catalyzed area, which seal is broken to allow oxygen access, and consequently the catalytic reaction. The airtight seal may be broken by simple manual methods or automatic methods on removal of the container from the fuel cell system.

20 Claims, 5 Drawing Sheets

SYSTEM AND METHOD FOR SAFE REMOVAL/OXIDATIVE DECOMPOSITION OF FUEL FROM A FUEL CONTAINER

BACKGROUND OF THE INVENTION

1. Field of the Invention

The present invention relates generally to the field of direct oxidation fuel cells, and in particular to a system and method for removal/oxidative decomposition of un-reacted fuel from a fuel storage container for use in a direct oxidation fuel cell and direct oxidation fuel cell system.

2. The Prior Art

Fuel cell technologies present opportunities for the commercial development of long-lasting power sources for portable power and electronics applications. With the trend toward greater portability of a wide array of consumer electronics, some fuel cell technologies offer promising alternative power sources to meet the increased demand for portable power. Fuel cells can potentially replace or favorably compete with the various types of high power density batteries presently used in consumer electronics, such as nickel metal-hydride and lithium ion battery systems, as well as relatively inexpensive alkaline batteries. These types of batteries are less than satisfactory power sources for such consumer electronics as laptop computers and cellular phones either due to their low power density, short cycle life, rechargability, or cost. In addition, all these types of batteries present environmental safety concerns and costs for proper disposal.

Fuel cell systems are electricity-generating devices that convert chemical energy into electricity via a simple electrochemical reaction involving a fuel reactant such as natural gas, methanol, ethanol, or hydrogen, and an oxidizing agent typically ambient air or oxygen into useable electrical energy. Fuel cell systems may be divided into "reformer-based" systems (i.e., those in which the fuel is processed in some fashion before it is introduced into the cell) and "direct oxidation" systems in which the fuel is fed directly into the cell without internal processing. Most currently available stationary fuel cells are reformer-based fuel cells. However, fuel processing requirements for such cells limits the applicability of those cells to relatively large systems.

Direct oxidation fuel cells, wherein the fuel reactant is fed directly into the fuel cell without internal modification or oxidation, are typically constructed of an anode diffusion layer, a cathode diffusion layer, and an electrolyte, such as a protonically conductive, electronically non-conductive membrane ("PCM"), that is disposed between the anode and cathode diffusion layers. Fuel reactant is introduced into the fuel cell anode and is presented to a catalytic layer intimately in contact with the anode face of the PCM. The anode catalyst layer separates hydrogen from the fuel reactant into protons and electrons as a result of oxidation, releasing hydrogen ions (protons and electrons) from the fuel reactant molecule. Upon the completion of a circuit, protons generated by the anodic catalytic reaction pass through the membrane electrolyte to the cathode of the fuel cell. Electrons generated by anodic oxidation of fuel molecules cannot pass through the membrane electrolyte, and seek another path through the load which is being powered. The electrons flow away from the anode catalyst, through the anode diffusion layer, through a load (typically via a current collector), through the cathode diffusion layer and to the cathode catalyst layer where the electrons combine with protons and oxygen to form water.

As long as adequate supplies of fuel reactant and an oxidizing agent are available to the fuel cell, the cell can generate electrical energy continuously and maintain a desired power output. Hence, fuel cells can potentially run laptop computers and cellular phones for several days rather than several hours, while reducing or eliminating the hazards and disposal costs associated with high density and alkaline batteries. A further benefit is that a fuel cell runs cleanly producing water and carbon dioxide as by-products of the oxidation/reduction of the fuel reactant. The challenge is to develop fuel cell technology and to engineer direct fuel cell systems to meet the form and operation requirements of small-scale or "micro" fuel cells for portable electronics applications.

Direct methanol fuel cell ("DMFC") systems are often multi-cell "stacks" including a number of single fuel cells joined to form a cell stack to increase the voltage potential to meet specific electrical power requirements. The feasibility of DMFC systems as alternative power sources for portable electronics applications will depend upon the reduction of the size of the overall system to meet demanding form factors, while satisfying the necessary power requirements for electrical power applications.

At present, prior art DMFC systems typically operate in several configurations, as disclosed, for example in U.S. Pat. Nos. 5,992,008, 5,945,231, 5,795,496, 5,773,162, 5,599,638, 5,573,866 and 4,420,544. As fuel cell technology is developed, other variations and configurations may develop with their own advantages and disadvantages.

In a DMFC, it is necessary to provide sufficient quantities of fuel (typically neat methanol or a mixture of water and methanol) to the catalyzed anode face of the PCM, and oxygen to the catalyzed cathode face of the PCM. Failure to allow sufficient quantities of the reactants to be introduced to the PCM results in the cessation of the reactions that generate electricity in a fuel cell.

Methanol is an attractive fuel for fuel cell systems, and as with most other appropriate fuels, it is flammable under certain conditions, and it may have detrimental effects on health if ingested.

In a typical fuel cell system, residual fuel remains in the spent anode effluent storage or in a container which is to be removed when practically, but not completely emptied. Keeping the fuel inside such a container after being discarded may raise some health or safety concerns. There remains a need, therefore, for a system and method for safe removal of such residual fuel from the spent fuel storage container or containers of a fuel cell and fuel cell system.

SUMMARY OF THE INVENTION

The present invention relates to a system for removal/oxidative decomposition of fuel from a fuel container, including a fuel container for a direct oxidation fuel cell, the container having a fuel reservoir; a conduit between the fuel reservoir and the direct oxidation fuel cell; and an aperture between the reservoir and the ambient environment, wherein the aperture is covered with a fuel permeable material, which is preferably coated with a catalyst, and the aperture and fuel permeable material are covered with a removable overlay providing an airtight and liquid seal.

Another aspect of the present invention relates to a system for removal/oxidative decomposition of fuel from a fuel container, including a fuel container for a direct oxidation fuel cell, the container having a fuel reservoir; a conduit between the fuel reservoir and the direct oxidation fuel cell; and an aperture between the reservoir and the ambient environment, wherein the aperture is covered with an oxygen permeable material, which is preferably coated with a catalyst, and the aperture and oxygen permeable material are covered with a removable overlay providing an airtight and liquid seal.

Another aspect of the present invention relates to a system for removal/oxidative decomposition of fuel from a fuel container, including a first fuel container for a direct oxidation fuel cell, the first fuel container having a first fuel reservoir; a first conduit between the first fuel reservoir and the direct oxidation fuel cell; and a waste liquid container including a waste liquid reservoir; a second conduit between the fuel cell or the first fuel reservoir and the waste liquid reservoir; and an aperture between the waste liquid reservoir and the ambient environment, wherein the aperture is covered with a fuel permeable material, which is coated with a catalyst.

Another aspect of the present invention relates to a method for the removal/oxidative decomposition of fuel in a fuel container, including providing a fuel container for a direct oxidation fuel cell, the container having a fuel reservoir containing fuel; a conduit between the fuel reservoir and the direct oxidation fuel cell; and an aperture between the fuel reservoir and the ambient environment, wherein the aperture is covered with a fuel permeable material and coated with a catalyst, and the aperture and fuel permeable material are covered with an overlay providing an airtight and liquid seal; and removing or puncturing at least a portion of the overlay to break the airtight seal exposing the catalyst to oxygen to catalytically oxidize the fuel.

Additional features of the invention will be set forth in the detailed description which follows, and in part will be readily apparent to those skilled in the art from the description or recognized by practicing the invention as described in the written description and claims hereof, as well as appended drawings.

It is to be understood that both the foregoing general description and the following detailed description are merely exemplary of the invention, and are intended to provide an overview or framework to understanding the nature and character of the invention as it is claimed.

BRIEF DESCRIPTION OF THE DRAWINGS

The accompanying drawings are included to provide a further understanding of the invention, and are incorporated in and constitute a part of this specification. The drawings illustrate one or more embodiment(s) of the invention and together with the description serve to explain the principles and operation of the invention. In the drawings.

DETAILED DESCRIPTION OF PREFERRED EMBODIMENTS

Figure 1:
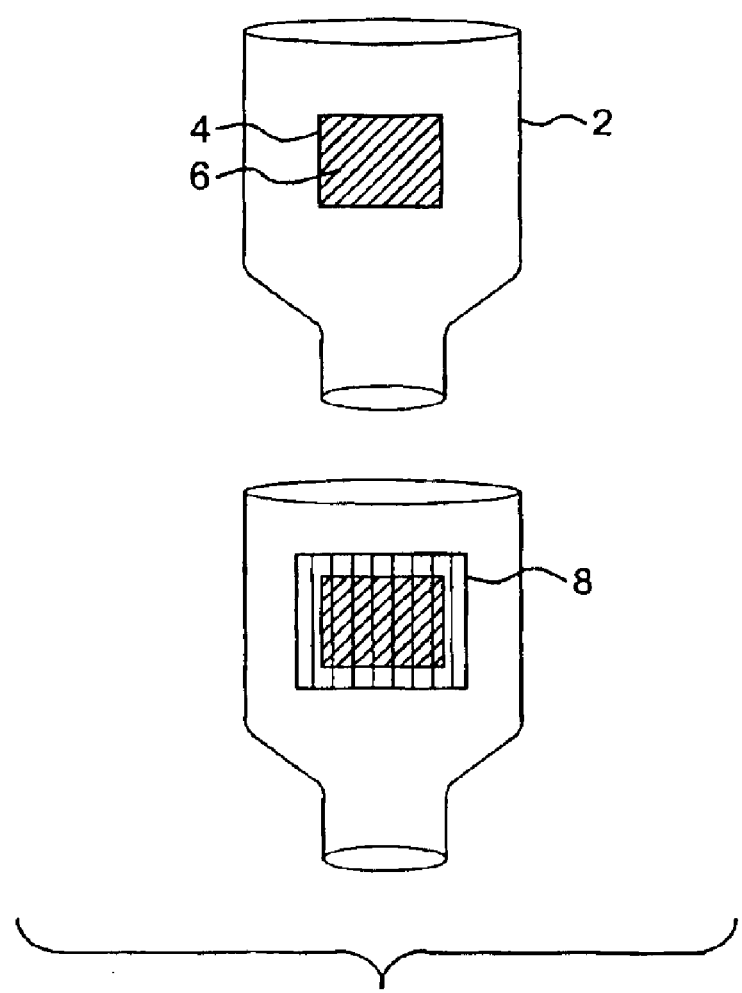
FIG. 1 is a schematic side view of one embodiment of a fuel container of the present invention having an aperture covered by a catalyzed material.

The present invention provides a solution for the safe release, or oxidative decomposition of residual fuel in a fuel reservoir or fuel source, or in a specially dedicated liquid waste tank, which is part of a fuel cell system. For purposes of illustration, we herein describe an illustrative embodiment of the invention as it is employed in connection with a DMFC system, with the fuel substance being neat methanol or an aqueous methanol solution. It should be understood, however, that it is within the scope of the present invention that the system and method for removal/oxidative decomposition of fuel from the fuel storage container or containers can be readily used with other fuels that are compatible with direct oxidation fuel cell systems. Thus, as used herein, the terms "fuel", "fuel reactant", and "fuel mixture" shall include methanol, ethanol, or combinations thereof and aqueous solutions thereof and other carbonaceous fuels that are suitable for use in a direct oxidation fuel cell system.

For purposes of illustration, and not by way of limitation, a description of one type of DMFC system is set forth herein. The direct methanol fuel cell system incorporates a PCM. The system is preferably disposed within a casing for use in portable applications. In a preferred embodiment, the direct oxidation fuel cell system contains a direct methanol fuel cell. The fuel cell has an anode chamber and cathode chamber surrounded by a housing. The anode chamber and cathode chamber are separated by the PCM which is preferably coated with an anode catalyst and a cathode catalyst. A fuel, such as methanol, is supplied to the anode chamber of the DMFC from a fuel source through a pump, or by using a pressurized cartridge or other fuel delivery system depending on the particular application.

As will be understood by those skilled in the art, a carbonaceous fuel solution such as aqueous methanol is presented to the PCM, typically through an anode diffusion layer. The fuel is disassociated by the catalysts in intimate contact with the anode face of the PCM, or which are otherwise present in the anode and cathode chambers, which enable direct oxidation of the carbonaceous fuel on the anode and the reduction of the products of the cathodic reaction on the cathode face of the PCM. Upon the completion of a circuit, the protons pass through the membrane electrolyte which is impermeable to the electrons. The electrons seek a different path to re-unite with the protons and travel through a load and thus provide the electrical power of the cell. This separates the hydrogen protons and electrons from the fuel molecules. The electrochemical reaction equations are as follows:

Anode: $CH_3OH + H_2O = CO_2 + 6H^+ + 6e^-$  Equation 1

Cathode: $4H^+ + 4e^- + O_2 = 2H_2O$  Equation 2

Net Process: $CH_3OH + 3/2\ O_2 = CO_2 + 2H_2O$  Equation 3

The anodic reaction of the direct oxidation fuel cell, as described in Equation 1, produces carbon dioxide ($CO_2$)

which is eliminated from the fuel cell system using methods and applications known to those skilled in the art. Water is produced in the cathode chamber, by the cathodic reaction described in Equation 2. Water is removed from the cathode chamber of the fuel cell system, and either re-circulated to the anode chamber, collected, or eliminated to the ambient environment.

Direct methanol fuel cells, such as the fuel systems disclosed in U.S. Pat. Nos. 5,992,008, 5,945,231, 5,773,162, 5,599,638, 5,573,866 and 4,420,544, which are herein incorporated by reference in their entirety, typically employ proton conducting, cation-exchange polymer membranes constructed of a perfluorocarbon sulfonic acid ("PFSA") ionomer, such as NAFION® commercially available from E. I. DuPont de Nemours and Co. Commercially available NAFION® membranes that act as membrane electrolytes for DMFC systems generally have a thickness of from 25 to 175 $\mu$m. Composite membranes are also commercially available and can act as membrane electrolytes. Composite membranes are significantly thinner than homogeneous ionomeric membranes and generally have a thickness of from 10 to 25 $\mu$m. Such composite membranes include, for instance, a polytetrafluorotheylene (PTFE) micromesh material with PFSA-filled pores available from W. L. Gore, Inc. of Newark, Del.

The membrane electrode assembly ("MEA") preferably includes an anode diffusion layer, a cathode diffusion layer, and a PCM disposed between the anode diffusion layer and the cathode diffusion layer. A catalyst layer is preferably disposed on one or both faces of the PCM in intimate contact with the respective diffusion layer. Those skilled in the art will recognize that preferably, the PCM, catalyst layers and diffusion layers are typically placed in intimate contact with, or otherwise bonded with each other and/or bonded to each other to form the MEA. Although the specific construction of the fuel cell and/or MEA in terms of components and structure may vary, the MEA is defined as a structure which facilitates the introduction of reactants, the maintenance of the electrochemical reactions and the removal of un-reacted reactants and reaction products and by-products to provide an electricity generating fuel cell. As used herein the terms "cathode", "cathode chamber" and "cathode aspect of the MEA" are interchangeable and meant to designate that portion of the fuel cell where the protons, electrons and oxygen are combined to form cathodically generated water. As used herein the terms "anode", "anode chamber" and "anode aspect of the MEA" are interchangeable and meant to designate that portion of the fuel cell where the protons, electrons and carbon dioxide are produced from the anodic disassociation of a fuel and water mixture.

Current collector plates and/or other current collecting components may be located on outer sides of the MEA of the fuel cell unit to conduct and collect electrons generated by the electrochemical oxidation of methanol. Suitable collector plates are typically constructed of carbon composites or metals, such as stainless steel and titanium, exhibit high electronic conductivity, and do not corrode or otherwise deteriorate in the presence of methanol, water, oxygen or other reactants or byproducts. Collector plates may be configured as bipolar plates and may be shaped to form flow fields having a range of flow channel geometry that provides effective mass transport of reactants, as well as effective removal of by-products of the reaction, including carbon dioxide and water. Alternatively, the current collector may be a thin screen or foil that is in contact with at least one electrically conductive component of the anode chamber.

In a preferred embodiment, a fuel storage container with an aperture covered by a fuel permeable material is provided with a removable overlay, preferably tape or foil, to create, on removal, air access to a catalyzed area of the fuel permeable material. Once fuel in the container has been practically but not completely consumed, or upon removal of the container for disposal, the overlay is removed to allow oxygen (typically from ambient air) access to the catalyzed surface of the material which, by virtue of its fuel permeability allows the residual fuel to react with the catalyst to form benign products of carbon dioxide and water. Typically, the removal of the overlay will occur when the fuel container is removed from the fuel cell system, because fuel concentration in the fuel storage container has dropped enough to render the remaining fuel useless for fuel cell operation, or the volume of fuel in the container is no longer sufficient to effectively deliver fuel to the fuel cell. However, there may be other instances where it is necessary or desirable to remove the overlay, and allow the fuel within the tank to be oxidized. Once the overlay is removed, air has access to the fuel permeable material and the remaining methanol catalyzes on the exterior surface of the fuel container. As shown in FIG. 1, a fuel storage container 2 has at least one portion that is composed of a fuel permeable material 4 that is coated with a catalyst 6. The catalyst 6 is covered with a removable airtight overlay 8. The airtight overlay 8 is made of materials known to those of skill in the art, such as a metallic foil or tape, which prevents oxygen from accessing the catalyst, and catalytically oxidizing the fuel. The airtight overlay 8 is also impermeable to fuel, and is bonded to the fuel container in such a fashion that neither fuel nor oxygen will substantially pass between the container and the ambient environment.

The airtight overlay 8 can be punctured or removed from the fuel storage container 2 by manual or automatic methods to allow oxygen to be introduced into the tank and oxidize the fuel. The manual method is accomplished by the user pulling off the foil or tape to expose the underlying catalyst. The automatic method is accomplished by a tab provided on the foil or tape that mechanically catches a member of the fuel cell system as described in more detail below in reference to FIGS. 4 and 5.

Those skilled in the art will recognize that a number of catalysts can be used to oxidize methanol in the presence of oxygen in accordance with the present invention. By way of illustration, and without limitation, platinum and platinum/ruthenium blends are typical materials whose uses as catalysts are well known. In addition, other metallic catalysts may be used to allow the air oxidation of methanol or other fuels.

In addition to metallic substances or compounds, the catalyst may be an enzyme which breaks down methanol in the presence of oxygen. Palmore, G. T. R; Whitesides, G. M. "Microbial and Enzymatic Biofuel Cells" in ACS Symposium Series No. 566, *Enzymatic Conversion of Biomass for Fuels Production* 1994, 271–290, which is incorporated herein by reference in its entirety, discloses enzymatic catalysts that oxidize methanol and other potential fuels to carbon dioxide under mild conditions (room temperature, atmospheric pressure, and neutral pH). For example, the enzymatic oxidation of methanol to carbon dioxide is provided by a combination of alcohol dehydrogenase, aldehyde dehydrogenase, and formate dehydrogenase with nicotinamide adenine dinucleotide as cofactor.

Figure 4:
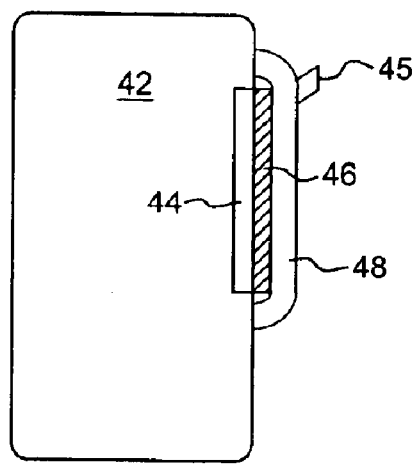
FIG. 4 is a schematic side view of one embodiment of a fuel container of the present invention wherein the overlay has a tab.

As shown in FIG. 4, a fuel storage container 42 has at least one portion that is composed of a fuel permeable material 44 that is coated with a catalyst 46. The catalyst 46 is covered with an airtight overlay 48 having a tab 45.

Figure 5:
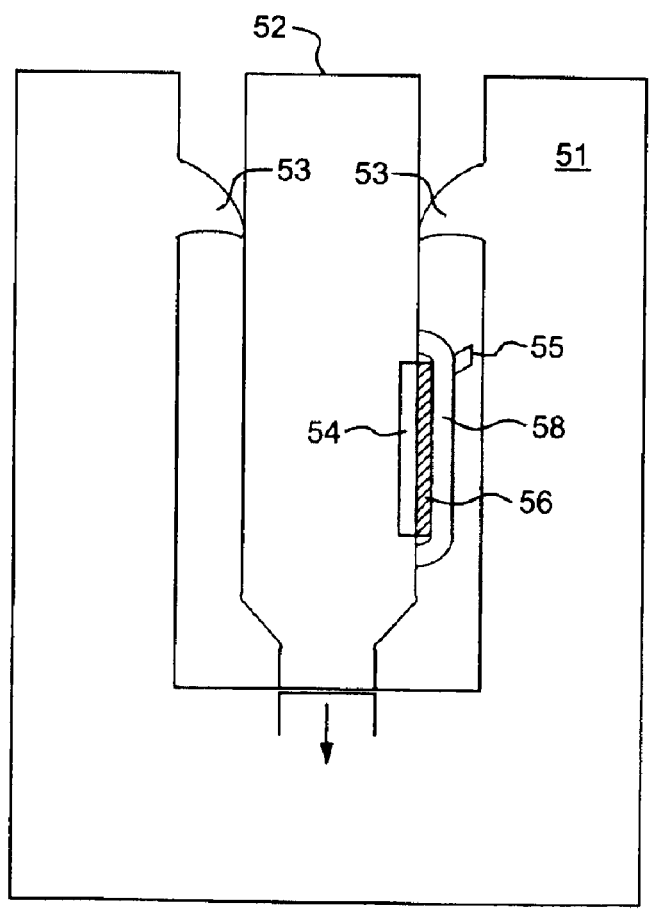
FIG. 5 is a schematic side view of one embodiment of a fuel cell system of the present invention having catch that engages the tab.

As shown in FIG. 5, the fuel is provided to an interface of a fuel cell system 51 having a catch 53 by a fuel cartridge 52. The fuel cartridge 52 has at least one portion that is composed of a fuel permeable material 54 that is coated with a catalyst 56. The catalyst 56 is covered with an airtight overlay 58 having a tab 55. Inserting the cartridge assembly (which includes the overlay 58 with tab 55) into the interface of the fuel cell system does not engage the tab in such a fashion that the overlay 58 is removed from the cartridge. However, when the spent cartridge 52 is removed, pulling the cartridge 52 out of the fuel cell system 51 causes the tab 55 to engage the catch 53 and peel back or puncture the overlay 58 and the catalyzed area of the material 54 is exposed to the air. The fuel cell system 51 is designed such that upon the insertion of a new fuel cartridge 52 the tab 55 does not come in contact with the catch 53, or the insertion can be accomplished without engaging the tab 55 in such a manner as to cause the overlay 58 to separate from the cartridge 52, allowing the overlay 58 to remain intact. The overlay 58 may be bonded to the cartridge 52 in such a way that only three sides peel off upon removal of the cartridge 52 from the fuel cell system 51 to prevent the overlay from breaking free and clogging the fuel cell system 51.

Figure 6:
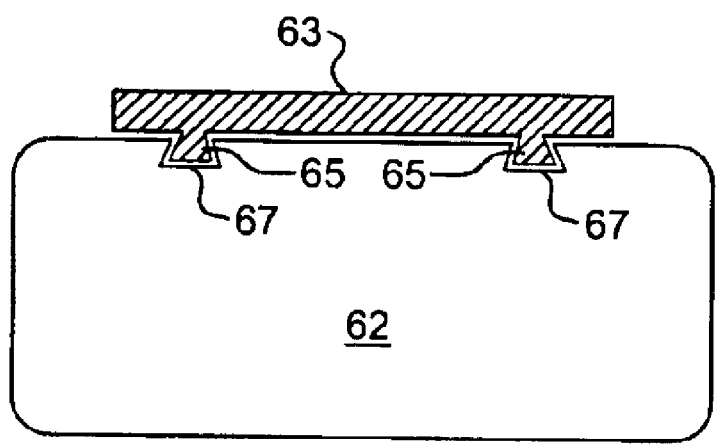
FIG. 6 is a schematic cross section view of one embodiment of a fuel container of the present invention having a sliding cover.
Figure 7:
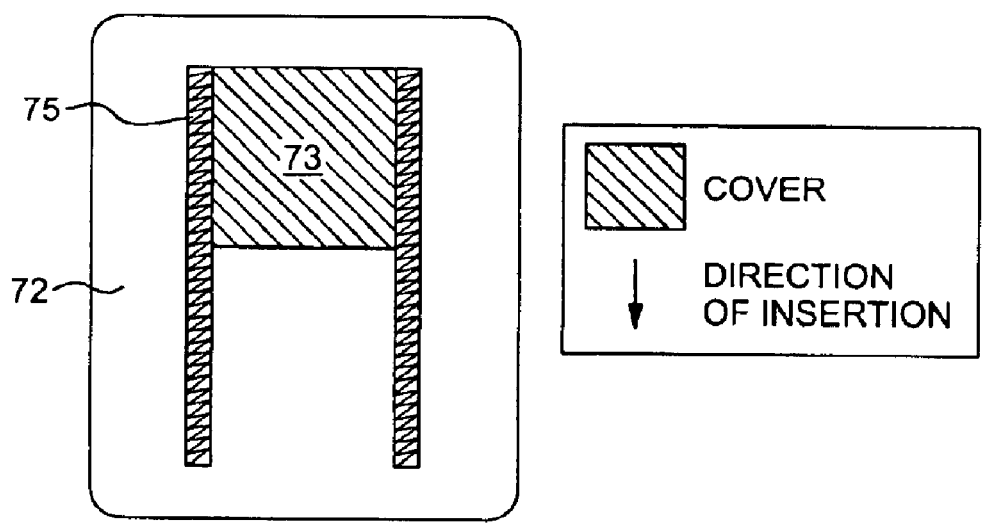
FIG. 7 is a schematic side view of one embodiment of a fuel container of the present invention having a sliding cover in the closed position.
Figure 8:
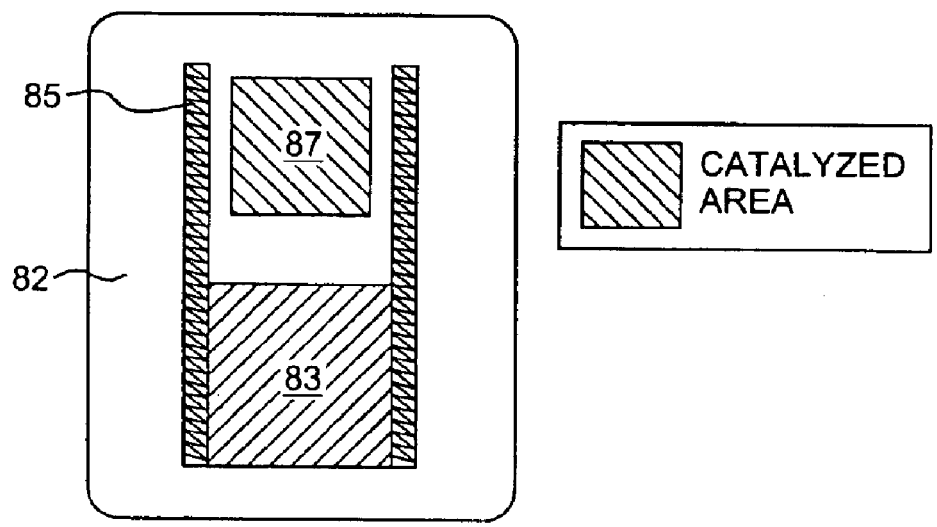
FIG. 8 is a schematic side view of one embodiment of a fuel container of the present invention having a sliding cover in the opened position.

In another preferred embodiment, shown in FIGS. 6–8 the storage container is provided with a sliding cover to create air access when the molarity of the main tanks has dropped enough to render the remaining fuel useless for fuel cell operation. Once the slider is moved to the side, air has access to the fuel permeable material and the remaining methanol catalyzes on the surface of the material. The slider can be activated by removal of a cartridge type fuel cell container. As shown in FIG. 6, the fuel storage container 62 has a sliding cover 63 that provides an airtight seal over the catalyst-coated material. The cover 63 has two rails 65 that engage a corresponding two grooves 67 enabling the cover 63 to slide back and forth between an opened and closed position. Other ways of constructing the sliding cover are known to those skilled in the art and are considered within the scope of the invention.

FIG. 7 shows a cover 73 of the fuel storage container 72 in the closed position 75 that provides an airtight overlay. The fuel cell system is designed such that the cover remains in the closed position during use.

FIG. 8 shows a cover 83 of the fuel storage container 82 in the opened position 85. The catalyzed area 87 is exposed to air when the cover 83 is in the opened position 85. The catalyzed area 87 is composed of a fuel permeable material that is coated with a catalyst. When the spent container 82 is removed from the fuel cell system the cover 83 is moved from the closed position to the opened position, preferably automatically. The automatic method can be accomplished by various configurations, including the tank fitting closely so that friction is created on the cover to urge the cover to slide or the system being fitted with a catch that engages the cover, when the tank is removed.

As noted above, removal of the airtight seal or actuation of the slider is accomplished by the action of removal of the fuel storage tank from the cell or system without further independent user interaction. Though the force is shown herein as a linear motion, it is further possible that an angular or rotational motion may be used to move the cover.

Figure 9:
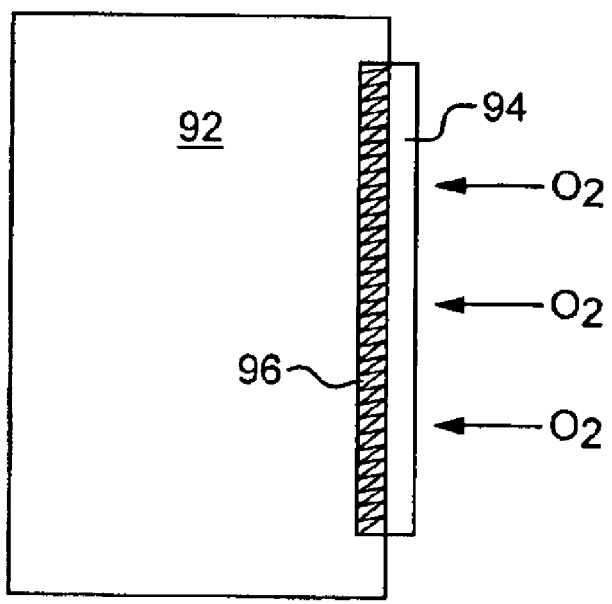
FIG. 9 is a schematic side view of one embodiment of a fuel container of the present invention having a catalyzed area on the inside of the container.

FIG. 9 shows an alternate embodiment where a fuel storage container 92 has at least one portion that is composed of an oxygen permeable material 94 that is coated with a catalyst 96 on the side facing the interior of the container. Preferably the oxygen permeable material 94 is also liquid impermeable. Removal of an airtight seal, such as preferably provided with a foil/tape or sliding cover, as set forth hereinabove allows oxygen to enter the container and the catalytic reaction with the fuel occurs within the fuel container.

The fuel permeable materials and oxygen permeable materials suitable for use in the present invention are preferably membranes. Suitable membranes of the present invention include but are not limited to polyurethane, silicone, polyester, and the like. In one embodiment, the material is coated with a catalyst on the interior aspect of the fuel cartridge and permeable to oxygen and preferably impermeable to liquid. When exposed to air, this material allows oxidation of the fuel at the catalyst inside the fuel container while preferably preventing liquid fuel from escaping. In another embodiment, the material is coated with a catalyst on the exterior aspect of the fuel cartridge and is permeable to the selected fuel. When exposed to air, this material allows oxidation of the fuel at the catalyst on the outer surface of the material by allowing fuel to penetrate the material and reach the catalyst. The choice of material can be related to the method of attachment to the tank, such as, adhesive bondability, heat staking ability, and the like and the desired properties of the material, as noted above.

Typically, the rate at which methanol is removed from the tank is a function of the size and permeability of the material. Consequently, a material covering the aperture in the container wall can be used without a catalyst, so as to allow only the slow release of fuel vapor, at a sufficiently low rate of vapor release that the air concentration of the fuel vapor will remain well below the hazard level.

In another preferred embodiment, the present invention is suitable for use in a DMFC system where anodic effluent, or liquid residue in a fuel reservoir is delivered to a discrete chamber within the fuel cell system. In this fuel cell system configuration, a specific area of a wall of the effluent waste chamber, is equipped with a catalyst-coated fuel permeable material. As the tank is moved, the waste solution sloshes around and comes in contact with the fuel permeable material and permeates outside the tank to react with oxygen. When the tank is still, the waste solution evaporates and permeates through the fuel permeable material in vapor form, and in time all waste methanol and water are removed while the methanol is oxidatively decomposed.

Figure 2:
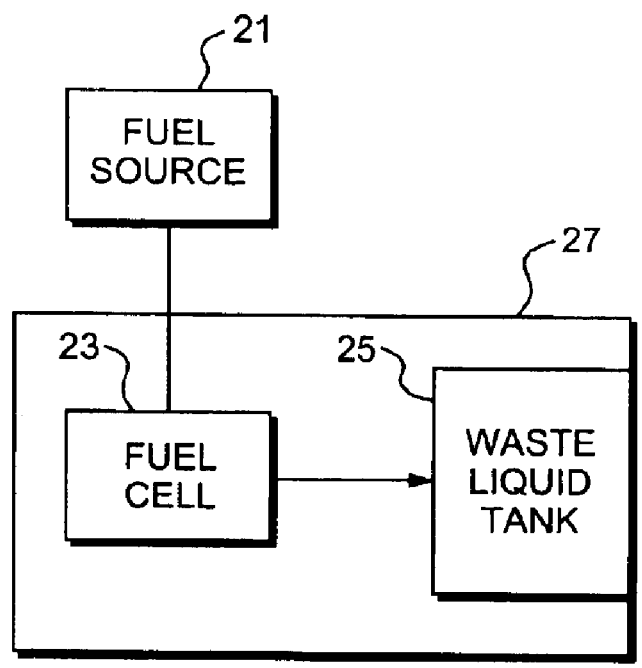
FIG. 2 is block diagram of one embodiment of a fuel cell system of the present invention having a waste liquid tank.
Figure 3:
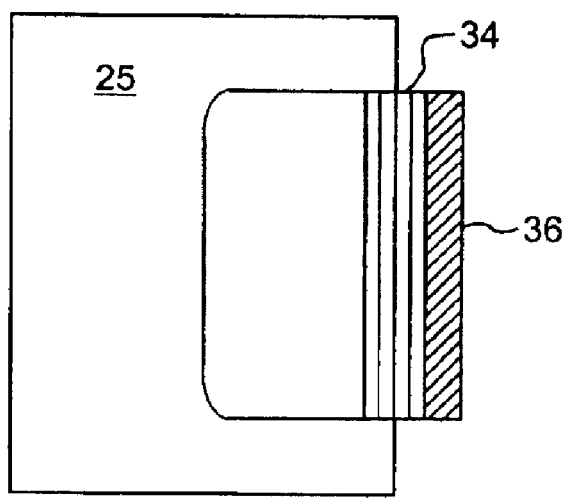
FIG. 3 is a schematic cross section view of the waste liquid tank of FIG. 2.

As shown in FIG. 2, a fuel source 21 supplies the fuel cell 23 with fuel. A waste liquid tank 25 in the fuel cell system 27 is fed waste liquid from the fuel cell 23, which includes fuel or diluted fuel. The waste liquid tank 25 has at least one portion that is provided with a fuel permeable material 34 that is coated with a catalyst 36, as shown in FIG. 3. The fuel permeable material 34 provides a conduit for the solution to contact the outside air at the catalyst so that liquid waste is oxidatively decomposed and the water in the waste liquid evaporates.

The foregoing description has been directed to specific embodiments of the invention and the embodiment best suited to a particular application can be selected for adaptation in that application. It will be apparent, however, that other variations and other modifications may be made to the described embodiments, with the attainment of some or all of the advantages of such, therefore, it is the object of the appended claims to cover all such variations and modifications as come within the true spirit and scope of the invention.

What is claimed is:

1. A system for removal/oxidative decomposition of fuel from a fuel container comprising:
   a fuel container for a direct oxidation fuel cell, the container comprising a fuel reservoir; a conduit between the fuel reservoir and the direct oxidation fuel cell; and an aperture between the reservoir and the ambient environment, wherein the aperture is covered with a fuel permeable material, and the aperture and fuel permeable material are covered with a removable overlay providing an airtight and liquid seal.

2. A fuel container for a direct oxidation fuel cell, comprising:
   a fuel container housing enclosing a fuel reservoir, said housing having an aperture that is substantially covered with a fuel permeable material, at least a portion of which also includes a catalyzed area, whereby upon air access to said catalyzed area, fuel in the reservoir is substantially catalyzed on the fuel permeable material to form carbon dioxide and water.

3. The fuel container as defined in claim 2 wherein said fuel permeable material is covered with a removable airtight overlay.

4. The fuel container as defined in claim 2 wherein said air-tight overlay is substantially comprised of at least one of the following: metallic foil or tape.

5. The fuel container as defined in claim 4 wherein said air-tight overlay is impermeable to fuel and is bonded to the fuel container housing such that neither fuel nor oxygen substantially passes between the fuel container and the ambient environment, when said airtight overlay is in place.

6. The fuel container as defined in claim 5 wherein said airtight overlay is puncturable by manual or automatic mechanisms such that oxygen is introduced into the fuel reservoir, causing oxidation of the fuel when said airtight overlay is punctured.

7. The fuel container as defined in claim 2 wherein said catalyst is selected from the group consisting of platinum, platinum/ruthenium, and platinum/ruthenium blends.

8. The fuel container as defined in claim 2 wherein said catalyst is an enzyme that breaks down methanol in the presence of oxygen.

9. The fuel container as defined in claim 8 wherein said enzyme is comprised at least in part of a combination of one or more of the following: alcohol dehydrogenase, aldehyde dehydrogenase, or formate dehydrogenase with nicotinamide adenine dinucleotide as a cofactor.

10. A fuel storage container for use with a direct oxidation fuel cell system, the container comprising:
   a container housing enclosing a fuel reservoir, at least a portion of said housing being composed of a substantially oxygen permeable material that is coated with a catalyst on an aspect thereof facing an interior of the container; and
   an airtight seal layer disposed on the outside of said housing over the oxygen permeable material, such that upon removal of said airtight seal, oxygen enters the fuel reservoir and a catalytic reaction with fuel occurs within the fuel reservoir.

11. The fuel storage container as defined in claim 10 wherein said oxygen permeable material is also liquid impermeable.

12. A direct oxidation fuel cell system including a direct oxidation fuel cell, the system comprising:
   a fuel cartridge, having a aperture, at least a portion of which is substantially comprised of a catalyst-coated fuel permeable material;
   a sealing element coupled with the catalyst-coated fuel permeable material; and
   a fuel cell housing including an interface adapted to receive said fuel cartridge and upon coupling of said fuel cartridge to said interface, fuel is delivered from the fuel cartridge to the fuel cell, and said interface including a removal mechanism that engages the sealing element of said fuel cartridge when said fuel cartridge is de-coupled from the housing in such a manner that the remaining fuel in the fuel cartridge is exposed to air and is substantially catalyzed.

13. The fuel cell system as defined in claim 12 wherein said removal mechanism includes a catch member, and said sealing element includes a tab such that when said fuel cartridge is de-coupled from the housing, the catch member engages the tab to separate the sealing element from the cartridge, exposing the catalyst-coated fuel permeable material to air, substantially catalyzing remaining fuel within the cartridge.

14. The fuel cell system as defined in claim 12 wherein said fuel cartridge includes a sliding mechanism having a first position forming a seal over the catalyst coated fuel permeable material, and a second position, in which it allows air access to said fuel permeable material.

15. The fuel cell system as defined in claim 14 further comprising
   an actuator coupled with said sliding mechanism which, upon removal of said cartridge from said fuel cell system, said actuator causes said sliding mechanism to move to said second position, thereby exposing the fuel permeable material to air.

16. A direct oxidation fuel cell system, comprising:
   a direct oxidation fuel cell;
   a fuel source coupled with said direct oxidation fuel cell; and
   an effluent waste chamber disposed in fluidic communication with said fuel such that said chamber receives waste liquid from said fuel cell, that includes fuel or diluted fuel, said effluent waste chamber having an aperture, covered with a substantially fuel permeable material at least a portion of which is coated with a catalyst, such that when said fuel permeable material is exposed to ambient air, liquid waste is substantially oxidatively decomposed while remaining within said fuel cell system.

17. A method for removal and oxidative/decomposition of fuel in a fuel container, including the steps of:
   providing a fuel container having an aperture that is covered with a fuel permeable material;
   covering at least a portion of the fuel permeable material with a catalyst; and
   promoting catalysis of unreacted fuel on said catalyst by exposing said fuel permeable material portion to ambient air.

18. The method as defined in claim 17 including the further step of:
   sealing the fuel permeable material so that the fuel is not catalyzed while the seal is in place.

19. The method as defined in claim 18 including the further step of:
   sensing a fuel level in said fuel container.

20. The method as defined in claim 19, including the further step of:
   rupturing said seal to allow air access to said fuel permeable material to substantially catalyze remaining fuel, when said fuel level reaches a predetermined level.

* * * * *